US009055559B2

(12) United States Patent
So

(10) Patent No.: US 9,055,559 B2
(45) Date of Patent: *Jun. 9, 2015

(54) METHOD AND SYSTEM FOR ESTABLISHING DISPARATE CONNECTION PATHS FROM A MOBILE USER DEVICE TO A BASE STATION THROUGH A MOBILE PEER-TO-PEER (PTP) NETWORK

(71) Applicant: Verizon Patent and Licensing Inc., Basking Ridge, NJ (US)

(72) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,134

(22) Filed: Jan. 15, 2014

(65) Prior Publication Data

US 2014/0133403 A1 May 15, 2014

Related U.S. Application Data

(63) Continuation of application No. 13/407,063, filed on Feb. 28, 2012, now Pat. No. 8,654,731, which is a continuation of application No. 11/961,435, filed on Dec. 20, 2007, now Pat. No. 8,175,043.

(51) Int. Cl.
*H04W 40/22* (2009.01)
*H04L 29/08* (2006.01)
*H04W 76/02* (2009.01)
*H04L 29/06* (2006.01)

(52) U.S. Cl.
CPC ............ *H04W 76/023* (2013.01); *H04W 76/02* (2013.01); *H04W 76/022* (2013.01); *H04W 40/22* (2013.01); *H04L 67/104* (2013.01); *H04L 69/14* (2013.01)

(58) Field of Classification Search
CPC .............................. H04W 40/22; H04L 69/14
See application file for complete search history.

(56) References Cited

U.S. PATENT DOCUMENTS

| 8,654,731 | B2* | 2/2014 | So ................................. 370/329 |
| 2003/0156558 | A1* | 8/2003 | Cromer et al. ................ 370/331 |
| 2005/0245270 | A1* | 11/2005 | Sartori et al. ................. 455/455 |

* cited by examiner

*Primary Examiner* — Jianye Wu

(57) ABSTRACT

A system and method for establishing and/or maintaining disparate connection paths from an originating mobile user device to a base station via a mobile peer-to-peer (PTP) network including an originating mobile user device configured to broadcast at least one of a path establishment request signal and a confirmation request signal to an intermediate mobile user device; a mobile peer-to-peer network including the intermediate mobile user device configured to forwarding at least one of the path establishment request signal, the path establishment response signal, the path confirmation request signal, and a path confirmation response signal, via a disparate connection path; and a base station configured to broadcasting at least one of the path establishment response signal and the path confirmation response signal to the originating mobile user device via one or more disparate connection paths within the mobile peer-to-peer network.

20 Claims, 4 Drawing Sheets

METHOD AND SYSTEM FOR ESTABLISHING DISPARATE CONNECTION PATHS FROM A MOBILE USER DEVICE TO A BASE STATION THROUGH A MOBILE PEER-TO-PEER (PTP) NETWORK

CROSS REFERENCE TO RELATED APPLICATION

The subject application is a continuation of U.S. application Ser. No. 13/407,063, filed on Feb. 28, 2012, which is a continuation of U.S. application Ser. No. 11/961,435, filed on Dec. 20, 2007, which are hereby incorporated by reference in their entirety.

BACKGROUND

Wireless networks have become increasingly popular for providing network access to a mobile user device. Wireless networks enable connectivity of mobile user devices to networked resources while reducing the need for traditional hard-wired network access. As a result, wireless networks provide a user with greater flexibility and convenience. For example, wireless networks allow for the mobility of a mobile user device within the coverage range of the wireless networks. However, wireless networks may be limited by coverage range and/or capacity to handle a number of mobile user devices. One typical wireless network may be a peer-to-peer (PTP) network. It may be difficult to maintain the peer-to-peer (PTP) network because one or more mobile user devices may be moving simultaneously in different directions and/or in and out of the peer-to-peer (PTP) network. Currently, a mobile user device may establish a connection to a base station via one primary connection path in the peer-to-peer (PTP) network. In the event that the primary connection path disappears the one or more mobile user devices may lose connection to the base station.

BRIEF DESCRIPTION OF THE DRAWINGS

In order to facilitate a fuller understanding of exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a connection system and process for establishing and/or maintaining one or more connection paths from a mobile user device to a base station through a mobile peer-to-peer (PTP) network. For example, the connection system may couple the mobile user device to the base station via one or more disparate connection paths. Also, the connection system may communicate with the mobile user device and/or the base station through a network, such as a wireless network and/or a wired network. Advantageously, the connection system may provide a mobile user device with one or more disparate connection paths to the base station in the event that the mobile user device loses a connection to the base station (e.g., outside a coverage range of a wireless network). Additionally, the connection system may enable a mobile user device to establish and/or maintain one or more disparate connection paths to the base station during an emergency (e.g., over capacity of a wireless network) via one or more intermediate mobile user devices. Moreover, the connection system may include a computer readable media including code to establish and/or maintain one or more connection paths from the mobile user device to the base station.

The description below describes mobile user device, mobile peer-to-peer (PTP) network, base station, and other components that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

Figure 1:
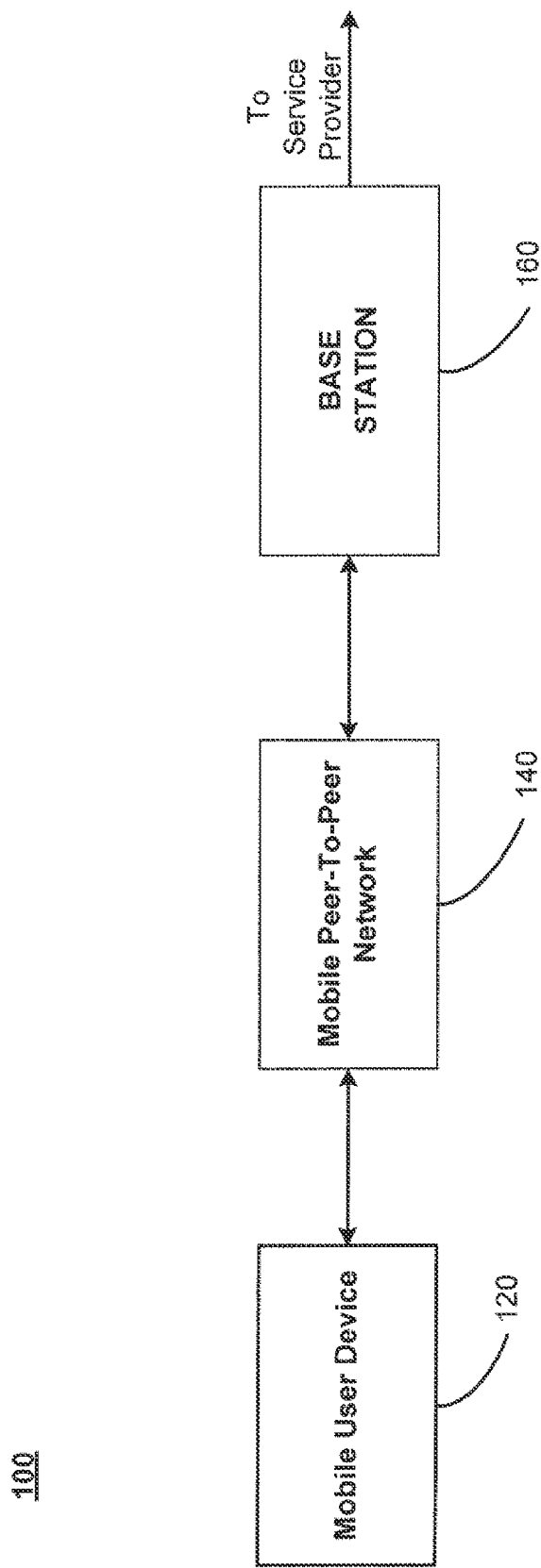
FIG. 1 illustrates a connection system for establishing and/or maintaining one or more disparate connection paths from a mobile user device to a base station via a mobile peer-to-peer (PTP) network, according to an exemplary embodiment.

FIG. 1 illustrates an exemplary connection system 100 for establishing and/or maintaining one or more connection paths from a mobile user device to a base station via a mobile peer-to-peer (PTP) network, according to an exemplary embodiment. System 100 may include one or more base stations 160 coupled to a service provider (not shown). Also, an originating mobile user device 120 may be connected to the one or more base stations 160 via a mobile peer-to-peer (PTP) network 140.

Mobile user device 120, may be a cellular communication device, a cellular telephone, a personal computer (PC), a global positioning system (GPS), a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, and/or other mobile communication devices capable of receiving and/or transmitting a signal for connection to the base station 160. Also, the mobile user device 120 may include a transceiver for receiving a signal from another mobile user device 120 and forwarding the received signal to another mobile user device 120 and/or the one or more intermediate mobile user devices. Further, the mobile user device 120 may include one or more databases for storing a peer-to-peer (PTP) routing table.

Mobile peer-to-peer (PTP) network 140, may include one or more mobile communication devices communicating with each other to form a peer-to-peer (PTP) network. The one or more mobile communication devices may include one or more mobile user devices 120 as described above. Also, the one or more mobile communication devices may include one or more devices capable of relying one or more communication signals between the mobile user device 120 and the base station 160.

One or more base stations 160, may include a base transceiver system, a base station controller, a base mobile switching center and/or other systems for enabling transmission/reception of data to and from the mobile user device 120 to the service provider (not shown). Also, the one or more base stations 160 may include one or more databases for storing a peer-to-peer (PTP) routing table. The one or more base station 160 may be connected to the service provider via a wireless network and/or a wired network.

Figure 2:
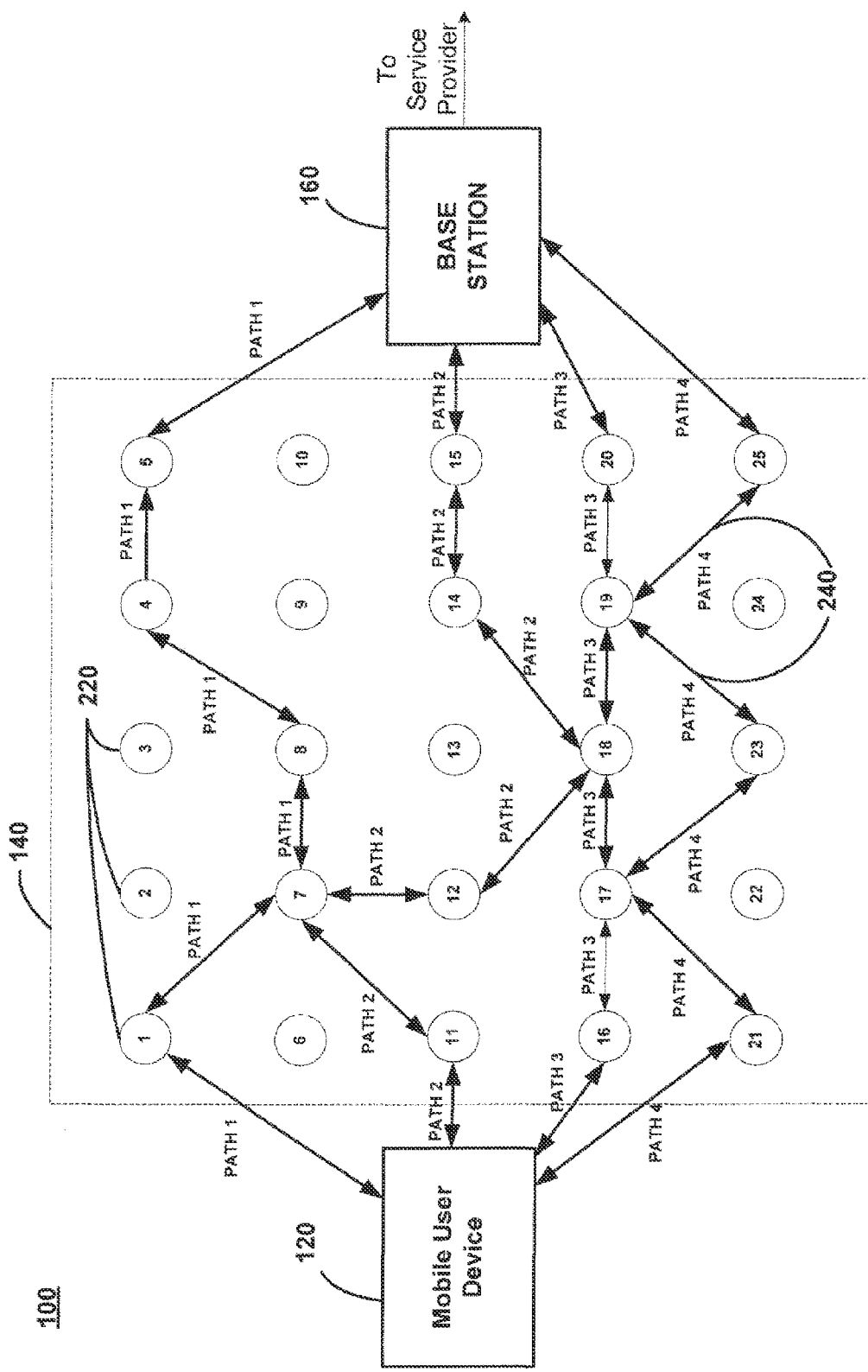
FIG. 2 illustrates a detailed mobile peer-to-peer (PTP) network for establishing and/or maintaining one or more disparate connection paths from a mobile user device to a base station, according to an exemplary embodiment.

FIG. 2, illustrates a detailed exemplary connection system 100 for establishing and/or maintaining one or more connection paths from a mobile user device to a base station via a mobile peer-to-peer (PTP) network, according to an exemplary embodiment. As illustrated in FIG. 2, the mobile peer-to-peer (PTP) network 140 may include one or more nodes 220 coupled by one or more communications links 240. The one or more nodes 220 and the one or more communication links 240 may be arranged to establish and/or maintain one or more disparate connection paths from the mobile user device 120 to the one or more base stations 160. For example, a disparate connection path from the mobile user device 120 to the one or more base stations 160 as illustrated in FIG. 2, may be enabled by transmission path 1 via a plurality of intermediate node 1, 7, 8, 4 and 5. Various disparate connection paths between the mobile user device 120 and the one or more base stations 160 may be established by different intermediate nodes within the mobile peer-to-peer (PTP) network 140. Although FIG. 2 illustrates that the mobile user device 120 is connected to one base station 160, the mobile user device 120 may be connected to a plurality of base stations 160 through one or more disparate connection paths.

As illustrated in FIG. 2, the mobile peer-to-peer (PTP) network 140 may include a plurality of nodes 220. However, the mobile peer-to-peer (PTP) network 140 may include one node 220 to connect the mobile user device 120 to the one or more base stations 160. The number of nodes 220 within the mobile peer-to-peer (PTP) network 140 may vary based at least in part on the location, time, coverage range, battery power, and functionality associated with the mobile user device 120. Also, the number of nodes 220 within the mobile peer-to-peer (PTP) network 140 may vary based at least in part selection by one or more users associated with the nodes 220. For example, the one or more users associated with the nodes 220 may select to activate or inactivate the one or more nodes 220 within the mobile peer-to-peer (PTP) network 140. Further, the number of nodes 220 within the mobile peer-to-peer (PTP) network 140 may vary based at least in part on the service provider (not shown). For example, the service provider (not shown) may activate or inactivate the one or more nodes 220 within the mobile peer-to-peer (PTP) network 140.

The one or more nodes 220 may be an originating node where transmission of data commences, a termination node where transmission of data terminates, and/or an intermediate node where transmission of data may traverse. The one or more nodes 220 may be one or more mobile communication devices for the mobile peer-to-peer (PTP) network 140, as described above, to enable a connection between each node. Also, the one or more nodes 220 may include one or more mobile user devices 120 as described above. In addition, the one or more nodes 220 may include a repeater, a digipeater, a signal carrier system, a broadcast translator, a cellular repeater, an Ethernet hub, a multi-port repeater, a microwave radio relay, a L-carrier, an optical communication repeater, an radio repeater and/or other devices that are capable of receives a signal and retransmit a signal.

Communication links 240 may be a communication channel that may connect two or more nodes 220. Communication links 240 may be one or more wired communication links and/or one or more wireless communication links. Communication link 240 may be a point-to-point link, a multi-point link, a point-to multi-point link, or a combination of different types of links mentioned before. For example, the one or more wired communication links may include optical fiber, multi-mode optical fibers, single-mode optical fibers, graded-index fibers, step-index optical fiber or a combination of the different types of optical fiber mentioned before. Further, the one or more wired communication links may include telephone line, co-axial cable and/or other wired communication link for transmission of data. The one or more wireless communication links may include cellular links, wireless LAN links, Global System for Mobile Communication (GSM) links, Personal Communication Service (PCS) links, Personal Area Network (PAN) links, D-AMPS links, Wi-Fi links, Fixed Wireless Data links, satellite links, IEEE 802.11a links, 802.11b links, 802.15.1 links, 802.11n and 802.11g links and/or other wireless link to enable transmission of data.

Figure 3:
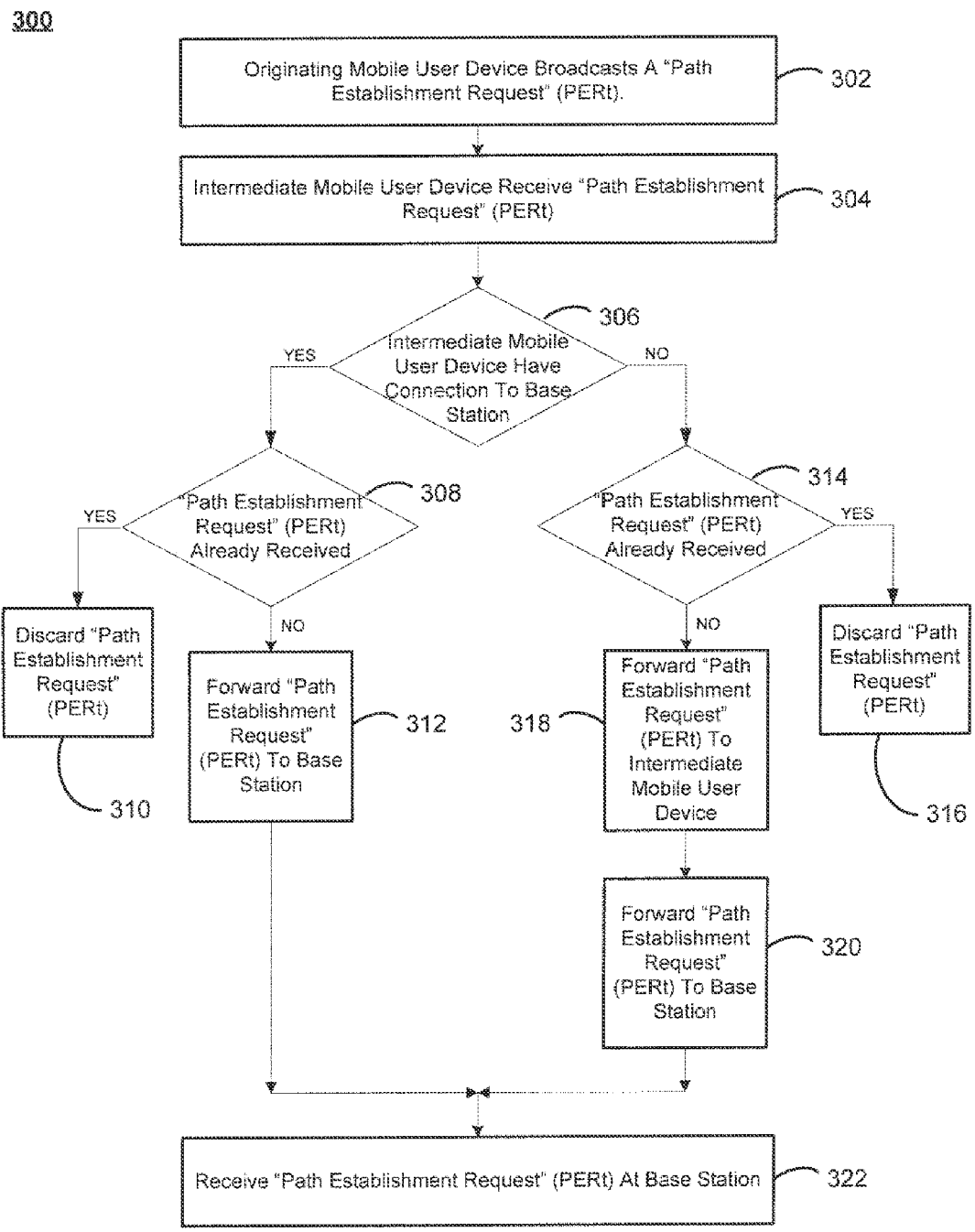
FIG. 3 illustrates a flow chart of a process for establishing and/or maintaining one or more disparate connection paths from a mobile user device to a base station through a mobile peer-to-peer (PTP) network, according to an exemplary embodiment.

FIG. 3 illustrates a flow chart of a process for establishing and/or maintaining one or more disparate connection paths from a mobile user device to a base station through a mobile peer-to-peer (PTP) network, according to an exemplary embodiment. This exemplary method 300 is provided by way of example, as there are a variety of ways to carry out the method. The method 300 shown in FIG. 3 can be executed or otherwise performed by one or a combination of various systems. The method 300 described below may be carried out by system 100 shown in FIGS. 1 and 2, by way of example, and various elements of the system 100 are referenced in explaining the example method of FIG. 3. Each block shown in FIG. 3 represents one or more processes, methods or subroutines carried in exemplary method 300. Referring to FIG. 3, exemplary method 300 may begin at block 302.

At block 302, an originating mobile user device 120 may broadcast a path establishment request (PERt) signal. A user associated with the originating mobile user device 120 may initiate a connection between the mobile user device 120 and one or more base stations 160 through a mobile peer-to-peer (PTP) network 140. For example, the user associated with the originating mobile user device 120 may activate a peer-to-peer (PTP) connection option to establish and/or maintain one or more connection paths to the one or more base stations 160 via the mobile peer-to-peer (PTP) network 140. Also, in the event that the originating mobile user device 120 loses a connection with the one or more base stations 160, the originating mobile user device 120 may automatically establish and/or maintain one or more connection paths to the one or more base stations 160 via the mobile peer-to-peer (PTP) network 140.

Also at block 302, the originating mobile user device 120 may broadcast the path establishment request (PERt) signal to one or more intermediate mobile user devices within a transmission range of the path establishment request (PERt) signal. For example, the originating mobile user device 120 may broadcast at a predetermined frequency. The predetermined frequency may be selected by the user associated with the originating mobile user device 120. Also, the predetermined frequency may be assigned by a service provider. For example, the predetermined frequency may include a public frequency, emergency frequency and/or other available frequency for broadcasting a signal. Also, the originating mobile user device 120 may utilize different broadcasting methods to broadcast the path establishment request (PERt) signal to one or more intermediate mobile user devices. For example, different broadcasting methods may include multi-cast broadcasting method, amplitude modulation broadcasting, frequency modulation broadcasting, narrowcasting, simulcasting and/or other broadcasting methods.

Also at block 302, the path establish request (PERt) signal broadcasted by the originating mobile user device 120 may include identification information associated with the originating mobile user device 120. The identification information may include at least one of a cellular telephone number, a SIM identification, a host identification, a location (e.g., GPS coordinates) and/or a time associated with the originating mobile user device 120 when broadcasting the path establish request (PERt) signal.

Also at block 302, the originating mobile user device 120 may broadcast the path establishment request (PERt) signal received from another source mobile user device or intermediate mobile user device. The received path establishment request (PERt) signal may include at least one of a cellular telephone number, a SIM identification, a host identification, a location (e.g., GPS coordinates) and a time associated with one or more mobile user devices that the path establishment request (PERt) signal may be forwarded through. Also, the originating mobile user device 120 may generate a new path establishment request (PERt) signal based at least in part on the received path established request (PERt) signal from another originating mobile user device or one or more intermediate mobile user devices. For example, the newly generated path establishment request (PERt) signal may incorporate information associated with the received path establishment request (PERt) signal along with the identification information associated with the originating mobile user device 120. Thereafter, the originating mobile user device 120 may broadcast the newly generated path establishment request (PERt) signal. After the originating mobile user device 120 may broadcast a path establishment request (PERt) signal, the method 300 may proceed to block 304.

At block 304, one or more intermediate mobile user devices located at one or more nodes 220 may receive the path establishment request (PERt) signal. For example, a user may be associated with the one or more intermediate mobile user devices located at the one or more nodes 220. The user associated with the one or more intermediate mobile user devices located at the one or more nodes 220 may activate or inactivate a peer-to-peer (PTP) connection option associated with the one or more intermediate mobile user devices located at the one or more nodes 220. For example, in the event that the user associated with the one or more intermediate mobile user devices located at the one or more nodes 220 may activate the peer-to-peer (PTP) connection option, the one or more intermediate mobile user devices may function as a temporary mobile relay station. Therefore, the user may activate the peer-to-peer (PTP) connection option associated with the one or more intermediate mobile user devices located at the one or more nodes 220 and receive the path establishment request (PERt) signal. Also, the user may inactivate the peer-to-peer (PTP) connection option associated with the one or more intermediate mobile user devices located at the one or more nodes 220 and reject the path establishment request (PERt) signal.

Also at block 304, the service provider associated with the one or more intermediate mobile user devices located at the one or more nodes 220 may activate or inactivate the peer-to-peer (PTP) connection option of the one or more intermediate mobile user devices. For example, the service provider associated with the one or more intermediate mobile user devices located at the one or more nodes 220 may inactivate the peer-to-peer (PTP) connection option. Also, during an emergency (e.g., fire, terrorist attack) and/or a natural disaster the service provider may activate the peer-to-peer (PTP) connection option associated with the one or more intermediate mobile user devices located at the one or more nodes 220 even though the user may inactivate the peer-to-peer (PTP) connection option.

Also at block 304, the one or more intermediate mobile user devices located at one or more nodes 220 may be simultaneously moving in and out of the mobile peer-to-peer (PTP) network 140. In the event that the one or more intermediate mobile user devices received the path establishment request (PERt) signal from the originating mobile user device 120 and moved outside the mobile peer-to-peer (PTP) network 140. Therefore, the originating mobile user device 120 may broadcast the path establishment request (PERt) signal again. Also in the event that one or more intermediate mobile user devices may move within the mobile peer-to-peer (PTP) network 140, the one or more intermediate mobile user devices may receive the path establishment request (PERt) signal broadcasted by the originating mobile user device 120. After, the one or more intermediate mobile user devices located at the one or more nodes 220 receive the path establishment request (PERt) signal, the method 300 may proceed block 306.

At block 306, the one or more intermediate mobile user devices located at the one or more nodes 220 which received the path establishment request (PERt) signal may determine whether the one or more intermediate mobile user devices have a connection to one or more base stations 160. In the event that the one or more intermediate mobile user devices located at the one or more nodes 220 may have a connection to the one or more base stations 160, the method 300 may proceed to block 308. Also, in the in event that the one or more intermediate mobile user devices located at the one or more nodes 220 may not have a connection to the one or more base stations 160, the method 300 may proceed to block 314.

At block 308, in the event that one or more intermediate mobile user devices located at the one or more nodes 220 may have a connection to the one or more base stations 160, the one or more intermediate mobile user devices located at the one or more nodes 220 may determine whether the received path establishment request (PERt) signal may have been received before. For example, the one or more intermediate mobile user devices located at the one or more nodes 220 may maintain a record of the received one or more path establishment requests (PERt) signals via a peer-to-peer (PTP) routing table. The one or more intermediate mobile user devices located at the one or more nodes 220 may compare the received path establishment request (PERt) signal with the previously recorded path establishment requests (PERt) signal in the peer-to-peer (PTP) routing table. In the event that the received path establishment request (PERt) signal may have already been received, the method 300 may proceed to block 310. In the event that the received path establishment request (PERt) signal may be a new path establishment request (PERt) signal, the method 300 may proceed to block 312.

At block 310, in the event that the received path establishment request (PERt) signal have already been received, the one or more intermediate mobile user devices located at the one or more nodes 220 may discard the received path establishment request (PERt) signal.

At block 312, in the event that the received path establishment request (PERt) signal may be a new path establishment request (PERt) signal, the one or more intermediate mobile user devices located at the one or more nodes 220 may forward the received path establishment request (PERt) signal to the one or more base stations 160. For example, the one or more intermediate mobile user devices located at the one or more nodes 220 may record the received path establishment request (PERt) signal in the peer-to-peer (PTP) routing table. Also, the one or more intermediate mobile user devices located at the one or more nodes 220 may encode identification information associated with the one or more intermediate mobile user devices to the received path establishment request (PERt) signal. The identification information associated with the one or more intermediate mobile user devices may include at least one of a cellular telephone number, a SIM identification, a host identification, a location (e.g., GPS coordinates) and/or a time associated with one or more intermediate mobile user devices located at the one or more nodes 220 to the received path establishment request (PERt) signal. Thereafter, the one or more intermediate mobile user devices located at the one or more nodes 220 may forward the encoded path establishment request (PERt) signal to the one or more base stations 160.

Also at block 312, the one or more intermediate mobile user devices located at the one or more nodes 220 may generate a new path establishment request (PERt) signal based at least in part on the received path establishment request (PERt) signal. For example, the newly generated path establishment request (PERt) signal may incorporate information associated with the received path established request (PERt) signal from another originating mobile user device or one or more intermediate mobile user devices. Thereafter, the one or more intermediate mobile user devices located at the one or more nodes 220 may transmit the newly generated path establishment request (PERt) signal to the one or more base stations 160. After the one or more intermediate mobile user devices located at the one or more nodes 220 may forward the received path establishment request (PERt) signal to the one or more base stations 160, the method 300 may proceed to block 314.

At block 314, in the event that one or more intermediate mobile user devices located at the one or more nodes 220 may not have a connection to the one or more base stations 160, the one or more intermediate mobile user devices located at the one or more nodes 220 may determine whether the received path establishment request (PERt) signal may have been received before. For example, the one or more intermediate mobile user devices located at the one or more nodes 220 may maintain a record of received one or more path establishment requests (PERt) signals via a peer-to-peer (PTP) routing table. The one or more intermediate mobile user devices located at the one or more nodes 220 may compare the received path establishment request (PERt) signal with the previously recorded one or more path establishment requests (PERt) signals in the peer-to-peer (PTP) routing table. In the event that the received path establishment request (PERt) signal may have already been received, the method 300 may proceed to block 316. In the event that the received path establishment request (PERt) signal may be a new path establishment request (PERt) signal, the method 300 may proceed to block 318.

At block 316, in the event that the received path establishment request (PERt) signal have already been received, the one or more intermediate mobile user devices located at the one or more nodes 220 may discard the received path establishment request (PERt) signal.

At block 318, in the event that the received path establishment request (PERt) signal may be a new path establishment request (PERt) signal, the one or more intermediate mobile user devices located at the one or more nodes 220 may forward the received path establishment request (PERt) signal to one or more intermediate mobile user devices within the mobile peer-to-peer (PTP) network 140 until a connection to the one or more base stations 160 may be established. For example, each intermediate mobile user devices within the mobile peer-to-peer (PTP) network 140 may record the received path establishment request (PERt) signal via a peer-to-peer (PTP) routing table. Also, each intermediate mobile user devices within the mobile peer-to-peer (PTP) network 140 may encode identification information associated with the one or more intermediate mobile user devices to the received path establishment request (PERt) signal. The identification information associated with the one or more intermediate mobile user devices may include at least one of a cellular telephone number, a SIM identification, a host identification, a location (e.g., GPS coordinates) and/or a time associated with each intermediate mobile user devices. Thereafter, each intermediate mobile user devices located at the one or more nodes 220 may forward the encoded path establishment request (PERt) signal to the one or more intermediate mobile user devices until a connection may be established with the one or more base stations 160.

Also at block 318, each intermediate mobile user devices within the mobile peer-to-peer (PTP) network 140 may generate a new path establishment request (PERt) signal based at least in part on the received path establishment request (PERt) signal. For example, the newly generated path establishment request (PERt) signal may be based at least in part on the received path established request (PERt) signal from another originating mobile user device or the one or more intermediate mobile user devices within the mobile peer-to-peer (PTP) network 140. Thereafter, each intermediate mobile user devices may transmit the newly generated path establishment request (PERt) signal to the one or more intermediate mobile user devices until a connection to the one or more base stations 160 may be established. After the one or more intermediate mobile user devices located at the one or more nodes 220 may forward the received path establishment request (PERt) signal to one or more intermediate mobile user devices within the mobile peer-to-peer (PTP) network 140 until a connection to the one or more base stations 160 may be established, the method 300 may proceed to block 320.

At block 320, the path establishment request (PERt) signal may be forwarded to an intermediate mobile user devices located at the one or more nodes 220 that may have a connection to the one or more base stations 160. As mentioned above at block 312, the intermediate mobile user device that may have a connection to the one or more base stations 160 may forward the received path establishment request (PERt) signal to the one or more base stations 160. After forwarding the received path establishment request (PERt) signal to the one or more base stations 160, the method 300 may proceed to block 322.

At block 322, the one or more base stations 160 may receive one or more path establishment request (PERt) signals via one or more disparate connection paths within the mobile peer-to-peer (PTP) network 140. For example, one base station 160 may receive one or more path establishment request (PERt) signals via one or more disparate connection paths within the mobile peer-to-peer (PTP) network 140. Also, a plurality of base stations 160 may receive one or more establishment request (PERt) signals via one or more disparate connection paths within the mobile peer-to-peer network 140. The one or more base stations 160 may receive the one or more path establishment request (PERt) signals and record the one or more path establishment request (PERt) signals on a routing database. The one or more path establishment request (PERt) signals may include one or more routing information associated with the one or more disparate connection paths. The one or more routing information associated with the one or more disparate connection paths may include at least one of identification information associated with the one or more intermediate mobile user devices located at the one or more nodes 220. Also, the one or more base stations 160 may record the one or more intermediate mobile user devices associated with the one or more disparate connection paths within the mobile peer-to-peer (PTP) network 140 on the routing database.

Figure 4:
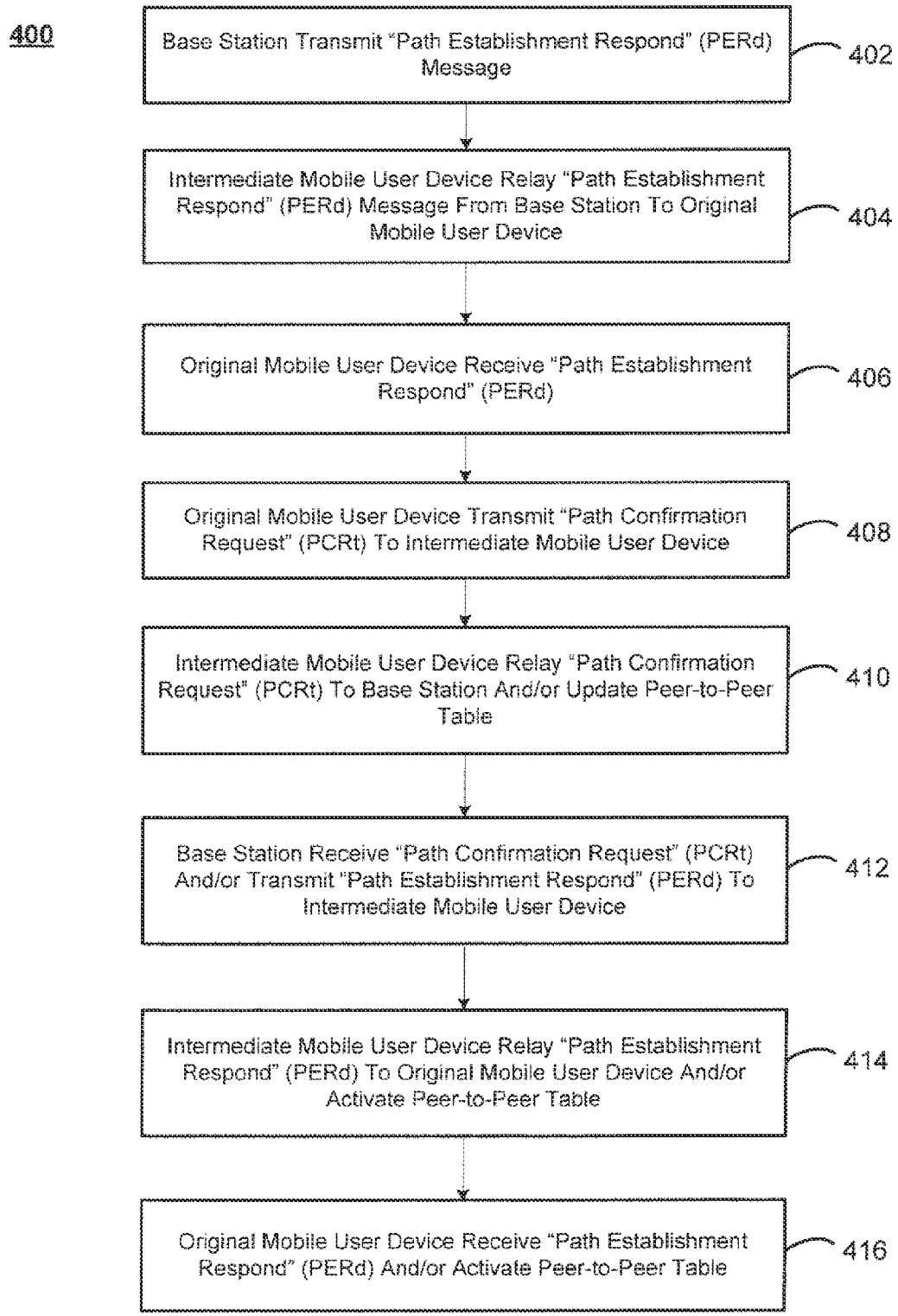
FIG. 4 illustrates a flow chart of a process for establishing and/or maintaining one or more disparate connection paths from a base station to a mobile user device through a mobile peer-to-peer (PTP) network, according to an exemplary embodiment.

FIG. 4 illustrates a flow chart illustrating an exemplary process for establishing and/or maintaining one or more connection paths from a base station to a mobile user device through a mobile peer-to-peer (PTP) network, according to an exemplary embodiment. This exemplary method 400 is provided by way of example, as there are a variety of ways to carry out the method. The method 400 shown in FIG. 4 can be executed or otherwise performed by one or a combination of various systems. The method 400 described below may be carried out by system 100 shown in FIGS. 1 and 2, by way of example, and various elements of the system 100 are referenced in explaining the example method of FIG. 4. Each block shown in FIG. 4 represents one or more processes, methods or subroutines carried in exemplary method 400. Referring to FIG. 4, exemplary method 400 may begin at block 402.

At block 402, one or more base stations 160 may broadcast one or more path establishment response (PERs) signals. For example, one base station 160 may broadcast one or more path establishment response (PERs) signals. Also, a plurality of base stations 160 may broadcast one or more path establishment response (PERs) signals. The one or more base stations 160 may receive the one or more path establishment request (PERt) signals associated with one or more disparate connection paths within a mobile peer-to-peer (PTP) network 140. The one or more base stations 160 may record the one or more received path establishment request (PERt) signals associated with the one or more disparate connection paths on a routing database. Also, the one or more base stations 160 may record routing information in the one or more received path establishment request (PERt) signals associated with the one or more disparate connection paths within the mobile peer-to-peer (PTP) network 140 on the routing database. The one or more base stations 160 may generate one or more path establishment response (PERs) signals based at in part on the received one or more path establishment request (PERt) signals. For example, the one or more base stations 160 may generate one or more establishment response (PERs) signals based at least in part on the one or more received path establishment request (PERt) signals associated with the one or more disparate connection paths. For example, the one or more path establishment response (PERs) signals may include identification information associated with the originating mobile user device 120. Also, the one or more path establishment response (PERs) signals may include identification information associated with the one or more intermediate mobile user devices of the one or more disparate connection paths within the mobile peer-to-peer (PTP) network 140. Further, the one or more path establishment response (PERs) signals may include one or more routing instructions associated with the one or more disparate connection paths within the mobile peer-to-peer (PTP) network 140. After the one or more base stations 160 may broadcast the one or more path establishment response (PERs) signals, the method 400 may proceed to block 404.

At block 404, one or more intermediate mobile user devices may forward the one or more path establishment response (PERs) signals to the originating mobile user device 120. For example, the one or more intermediate mobile user devices may receive the one or more path establishment response (PERs) signals from the one or more base stations 160. The one or more intermediate mobile user devices may be associated with the one or more disparate connection paths within the mobile peer-to-peer (PTP) network 140. The one or more path establishment response (PERs) signals from the one or more base stations 160 may be forwarded to the originating mobile user device 120 via the one or more disparate connection paths within the mobile peer-to-peer (PTP) network 140.

Also at block 404, the one or more intermediate mobile user devices may forward the one or more path establishment response (PERs) signals based at least in part on the one or more routing instructions associated with the one or more disparate connection paths. Further, one or more intermediate mobile user devices may be part of the one or more routing instructions associated with the one or more disparate connection paths may move outside the mobile peer-to-peer (PTP) network 140. The one or more path establishment response (PERs) signals may not be forwarded to the originating mobile user device 120. Moreover, one or more intermediate mobile user devices may be part of the one or more routing instructions associated with the one or more disparate connection paths may inactivate the peer-to-peer (PTP) connection option of the one or more intermediate mobile user devices. Therefore, one or more path establishment response (PERs) signals may not be forwarded to the originating mobile user device 120. After the one or more intermediate mobile user devices may forward the one or more path establishment response (PERs) signals to the originating mobile user device 120, the method 400 may proceed to block 406.

At block 406, the originating mobile user device 120 may receive one or more path establishment response (PERs) signals. The originating mobile user device 120 may receive one or more path establishment response (PERs) signals associated with the one or more disparate connection paths within the mobile peer-to-peer (PTP) network 140 and/or one or more base stations 160. The originating mobile user device 120 may establish one or more disparate connection paths within the mobile peer-to-peer (PTP) network 140 based at least in part on the received one or more path establishment response (PERs) signals. Therefore, the originating mobile user device 120 may maintain one or more disparate connection paths to the one or more base stations 160.

Also at block 406, the originating mobile user device 120 may select a predetermined number of disparate connection paths within the mobile peer-to-peer (PTP) network 140. For example, a user associated with the originating mobile user device 120 may select a predetermined number of disparate connection paths within the mobile peer-to-peer (PTP) network 140. Also, a service provider associated with the one or more base stations 160 may select a predetermined number of disparate connection paths within the mobile peer-to-peer (PTP) network 140. For example, the originating mobile user device 120 may establish and/or maintain three to five disparate connection paths within the mobile peer-to-peer (PTP) network 140.

Further at block 406, the originating mobile user device 120 may use one or more mathematical algorithms to select the one or more received path establishment response (PERs) signals to establish and/or maintain one or more disparate connection paths within the mobile peer-to-peer (PTP) network 140 to the one or more base stations 160. For example, in the event that one path establishment response (PERs) signal may be received by the originating mobile user device 120. The received path establishment response (PERs) signal may be associated with one connection path within the mobile peer-to-peer (PTP) network 140. The mathematical algorithm may select the one or more received path establishment response (PERs) signals to establish and/or maintain the connection path within the mobile peer-to-peer (PTP) network 140. Also, in the event that the originating mobile user device 120 may receive a plurality of path establishment response (PERs) signals, the originating mobile user device 120 may select to establish and/or maintain a predetermined number of disparate connection paths within the mobile peer-to-peer (PTP) network 140. One or more mathematical algorithms may be used select from the plurality of path establishment response (PERs) signals to establish and/or maintain the predetermined number of disparate connection paths within the mobile peer-to-peer (PTP) network 140. For example, the originating mobile user device 120 may select one or more disparate connection paths based at least in part on a number of nodes 220 associated with the one or more disparate connection paths. The originating mobile user device 120 may select one or more disparate connection paths having a minimum number of nodes 220 between the originating mobile user device 120 and the one or more base stations 160. Also, the originating mobile user device 120 may select one or more disparate connection paths based at least in part on the signal traveling time between the originating mobile user device 120 and the one or more base stations 160. The originating mobile user device 120 may select one or more disparate connection paths having minimum signal (e.g., path establishment request (PERt) signal and/or path establishment response (PERs) signal) travel time between the originating mobile user device 120 and the one or more base stations 160. Further, the originating mobile user device 120 may select one or more disparate connection paths based at least in part on an association with the one or more selected base stations 160. The originating mobile user device 120 may select one or more disparate connection paths based at least in part on the association with the one or more base stations 160 selected by the originating mobile user device 120. Moreover, the originating mobile user device 120 may select one or more disparate connection paths based at least in part on a use associated with the originating mobile user device 120 and/or a service provider associated with the one or more base stations 160. For example, the user and/or the service provider may select from the plurality of path establishment response (PERs) signals to establish and/or maintain one or more disparate connection paths between the originating mobile user device 120 and the one or more base stations 160. Furthermore, a combination of selection method described above may be used to select one or more path establishment response (PERs) signals to establish and/or maintain one or more disparate connection paths between the originating mobile user device 120 and the one or more base stations 160.

Furthermore at block 406, the originating mobile user device 120 may receive a plurality of path establishment response (PERs) signals. The received plurality of path establishment response (PERs) signals may be associated with a plurality of connection paths. However, the plurality of connection paths may share one or more common nodes 220 within the mobile peer-to-peer (PTP) network 140. The originating mobile user device 120 may select one or more "primary" connection paths based at least in part on the one or more common nodes 220. Also, the originating mobile user device 120 may select one or more "secondary" connection paths sharing the one or more primary connection paths. For example, the one or more "primary" connection paths and/or the one or more "secondary" connection paths may be selected based at least on one of a number of nodes 220 associated with the one or more disparate connection paths, a signal traveling time between the originating mobile user device 120 and the one or more base stations 160, an association with the one or more selected base stations 160, and a user selection.

Moreover, the originating mobile user device 120 may not receive a path establishment response (PERs) signal. The originating mobile user device 120 may continuously and/or periodically rebroadcast a path establishment request (PERt). After the originating mobile user device 120 may receive one or more path establishment response (PERs) signals, the method 400 may proceed to block 408.

At block 408, the originating mobile user device 120 may broadcast one or more path confirmation request (PCRt) signals to one or more intermediate mobile user devices associated with the one or more selected disparate connection paths. The originating mobile user device 120 may broadcast one or more path confirmation request (PCRt) signals based at least in part on the one or more disparate connection paths within the mobile peer-to-peer (PTP) network 140. For example, the one or more path confirmation request (PCRt) signals may contain information associated with the one or more disparate connection paths within the mobile peer-to-peer (PTP) network 140. The information associated with the one or more disparate connection paths within the mobile peer-to-peer (PTP) network 140 may include at least one of identification information associated with the one or more intermediate mobile user devices of the disparate connection paths, routing instructions, and identification information associated with the originating mobile user device 120. After the originating mobile user device 120 may broadcast the one or more path confirmation request (PCRt) signals to the one or more intermediate user devices, the method 400 may proceed to block 410.

At block 410, the one or more intermediate mobile user devices may forward the one or more path confirmation request (PCRt) signals to the one or more base stations 160. For example, the one or more intermediate user devices may be associated with each disparate connection paths from the originating mobile user device 120 to the one or more base stations 160 within the mobile peer-to-peer (PTP) network 140. Each intermediate mobile user device within each disparate connection path may forward the path confirmation request (PCRt) signal until the one or more base stations 160 may receive the path confirmation request (PCRt) signal. Each intermediate mobile user device within each disparate connection path may forward the path confirmation request (PCRt) signal based at least in part on the routing instruction of the path confirmation request (PCRt) signal. Also, each intermediate mobile user device within each disparate connection path may update a routing table of each intermediate mobile user device based at least in part on the information associated with the path confirmation request (PCRt) signal. For example, each intermediate mobile user device within each disparate connection path may record all the information associated with the path confirmation request (PCRt) signal. Also, each intermediate mobile user device may record a partial information associated with the path confirmation request (PCRt) signal. For example, the intermediate mobile user device may record identification information associated with contiguous mobile user device based at least in part on the routing instruction of the path confirmation request (PCRt) signal. Also, the one or more intermediate mobile user devices located at the one or more nodes 220 of the one or more selected disparate connection paths may move outside the mobile peer-to-peer (PTP) network 140. The one or more intermediate mobile user devices located at the one or more nodes 220 of the one or more selected disparate connection paths may inactivate the peer-to-peer (PTP) connection option. Therefore, the one or more path confirmation request (PCRt) signals may not be forwarded to the one or more base stations 160. After the one or more intermediate mobile user devices may forward the one or more path confirmation request (PCRt) signals to the one or more base stations 160, the method 400 may proceed to block 412.

At block 412, the one or more base stations 160 may broadcast one or more path confirmation response (PCRs) signals. For example, the one or more base stations 160 may receive the one or more path confirmation request (PCRt) signals from the one or more intermediate mobile user devices associated with the one or more disparate connection paths within the mobile peer-to-peer (PTP) network 140. The one or more base stations 160 may generate the one or more path confirmation response (PCRs) signals based at least in part on the received one or more path confirmation request (PCRt) signals. For example, the one or more path confirmation response (PCRs) signals may include at least one of identification information associated with each intermediate mobile user devices of each disparate connection path, routing instruction and identification information associated with the originating mobile user device 120. Further, the one or more base stations 160 may update a peer-to-peer (PTP) routing table. The peer-to-peer (PTP) routing table may include at least one of identification information associated with each intermediate mobile user devices of each disparate connection paths, routing instruction and identification information associated with the originating mobile user device 120. After the one or more base stations 160 may broadcast the one or more path confirmation response (PCRs) signals, the method 400 may proceed to block 414.

At block 414, the one or more intermediate mobile user devices may forward the one or more path confirmation response (PCRs) signals to the originating mobile user device 120. Each intermediate mobile user device of each disparate connection paths may receive the path confirmation response (PCRs) signal associated with the disparate connection path. Upon receiving the path confirmation response (PCRs) signal, each intermediate mobile user device of each disparate connection path may activate a peer-to-peer (PTP) table based at least in part on the path confirmation response (PCRs) signal. By activating the peer-to-peer (PTP) table associated with each intermediate mobile user device, the intermediate mobile user device may function as a temporary relay station and connect the originating mobile user device 120 to the one or more base stations 160. Also, the one or more intermediate mobile user devices may forward the one or more path confirmation response (PCRs) signals until the originating mobile user device 120 may receive the one or more path confirmation response (PCRs) signals. After the one or more intermediate mobile user devices may forward the one or more path confirmation response (PCRs) signals to the originating mobile user device 120, the method 400 may proceed to block 416.

At block 416, the originating mobile user device 120 may receive the one or more path confirmation response (PCRs) signals. The originating mobile user device 120 may record the received one or more path confirmation response (PCRs) signals on a peer-to-peer (PTP) routing table. By activating the peer-to-peer (PTP) routing table, the originating mobile user device 120 may establish one or more disparate connection paths within the mobile peer-to-peer (PTP) network 140 to the one or more base stations 160.

It may be appreciated by one skilled in the art that the connection system 100 enables the mobile user device 120 to establish one or more disparate connection paths to the base station 160 via one or more intermediate mobile user devices located at the mobile peer-to-peer (PTP) network 140. For example, in the event that a user associated with the mobile user device 120 may be hiking in an area outside a coverage range of the base station 160. The mobile user device 120 may loses a connection to the base station 160. Also, in the event of a natural disaster and/or an terrorist attack, a wireless network may be over loaded with mobile user devices and therefore the mobile user device 120 may loses a connection to the base station 160. The mobile user device 120 may establish and/or maintain a predetermined number of disparate connection paths with the base station 160 via one or more intermediate mobile user device in the mobile peer-to-peer (PTP) network 140. The mobile user device 120 may establish and/or maintain five disparate connection paths to ensure a stable and reliable connection with the base station 160. Therefore, in the event that one or more of the five disparate connection paths may be lost due to one or more intermediate mobile user devices of the one or more disparate connection paths moved outside the mobile peer-to-peer (PTP) network 140. The mobile user device 120 may still maintain a connection to the base station 160 via the mobile peer-to-peer (PTP) network 140.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
generating a path establishment request signal for transmission to an intermediate mobile user device from an originating mobile user device;
transmitting the path establishment request signal to the intermediate mobile device;
determining whether the intermediate mobile user device has a connection to a base station; and
if the intermediate mobile user device has a connection to the base station, transmitting a path establishment response signal to the originating mobile user device.

2. The method of claim 1, further comprising: determining whether the path establishment request signal has already been received by the intermediate mobile user device.

3. The method of claim 2, further comprising: discarding the path establishment request signal if the path establishment request signal has already been received by the intermediate mobile user device.

4. The method of claim 1, further comprising: if the intermediate mobile user device does not have a connection to the base station, forwarding the path establishment request signal to another intermediate mobile device.

5. The method of claim 1, further comprising: establishing a plurality of disparate connection paths with the base station when the originating mobile user device loses a connection path with the base station.

6. The method of claim 5, wherein at least one of the plurality of disparate connection paths establishes or maintains communication between the originating mobile user device and the base station.

7. The method according to claim 1, wherein the intermediate mobile user device is part of a mobile peer-to-peer network.

8. An apparatus comprising:
one or more processors configured to,
generate a path establishment request signal for transmission to an intermediate mobile user device from an originating mobile user device,
transmit the path establishment request signal to the intermediate mobile device;
determine whether the intermediate mobile user device has a connection to a base station; and
if the intermediate mobile user device has a connection to the base station, transmit a path establishment response signal to the originating mobile user device.

9. The apparatus according to claim 8, wherein the one or more processors is further configured to determine whether the path establishment request signal has already been received by the intermediate mobile user device.

10. The apparatus according to claim 9, wherein the one or more processors is further configured to discard the path establishment request signal if the path establishment request signal has already been received by the intermediate mobile user device.

11. The apparatus according to claim 8, wherein the one or more processors is further configured to establish a plurality of disparate connection paths with the base station when the originating mobile user device loses a connection path with the base station.

12. The apparatus according to claim 8, wherein the one or more processors is further configured to establish or maintain communication between the originating mobile user device and the base station.

13. The apparatus according to claim 8, wherein the one or more intermediate mobile user devices are part of a mobile peer-to-peer network.

14. The apparatus of claim 8, wherein the one or more processors is further configured to forward the path establishment request signal to another intermediate mobile device if the intermediate mobile user device does not have a connection to the base station.

15. A non-transitory computer-readable storage medium carrying one or more sequences of one or more instructions which, when executed by one or more processors, cause an apparatus to at least perform the following:
generating a path establishment request signal for transmission to an intermediate mobile user device from an originating mobile user device;
transmitting the path establishment request signal to the intermediate mobile device;
determining whether the intermediate mobile user device has a connection to a base station; and
if the intermediate mobile user device has a connection to the base station, transmitting a path establishment response signal to the originating mobile user device.

16. The non-transitory computer-readable storage medium of claim 15, wherein the apparatus is further caused to determine whether the path establishment request signal has already been received by the intermediate mobile user device.

17. The non-transitory computer-readable storage medium of claim 15, wherein the apparatus is further caused to discard the path establishment request signal, if the path establishment request signal has already been received by the intermediate mobile user device.

18. The non-transitory computer-readable storage medium of claim 15, wherein the apparatus is further caused to establish a plurality of disparate connection paths with the base station when the originating mobile user device loses a connection path with the base station.

19. The non-transitory computer-readable storage medium of claim 18, wherein the apparatus further causes at least one of the plurality of disparate connection paths to establish or maintain communication between the originating mobile user device and the base station.

20. The non-transitory computer-readable storage medium of claim 15, wherein the apparatus further forwards the path establishment request signal to another intermediate mobile device if the intermediate mobile user device does not have a connection to the base station.

* * * * *